Aug. 3, 1965  G. F. CAVANAUGH  3,198,095
PHOTO-COMPOSING APPARATUS
Filed Jan. 18, 1963  4 Sheets-Sheet 1
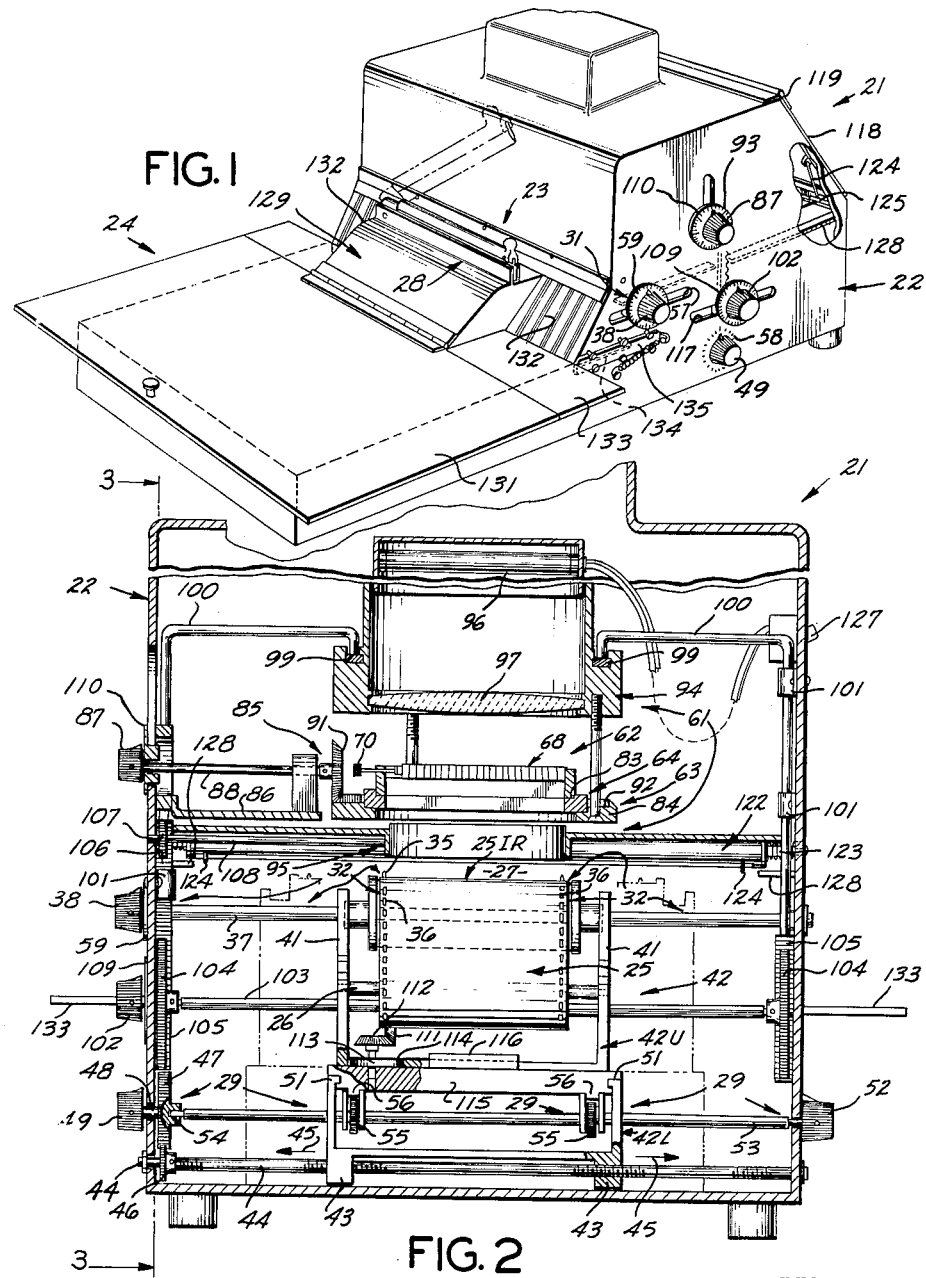
INVENTOR.
GEORGE F. CAVANAUGH

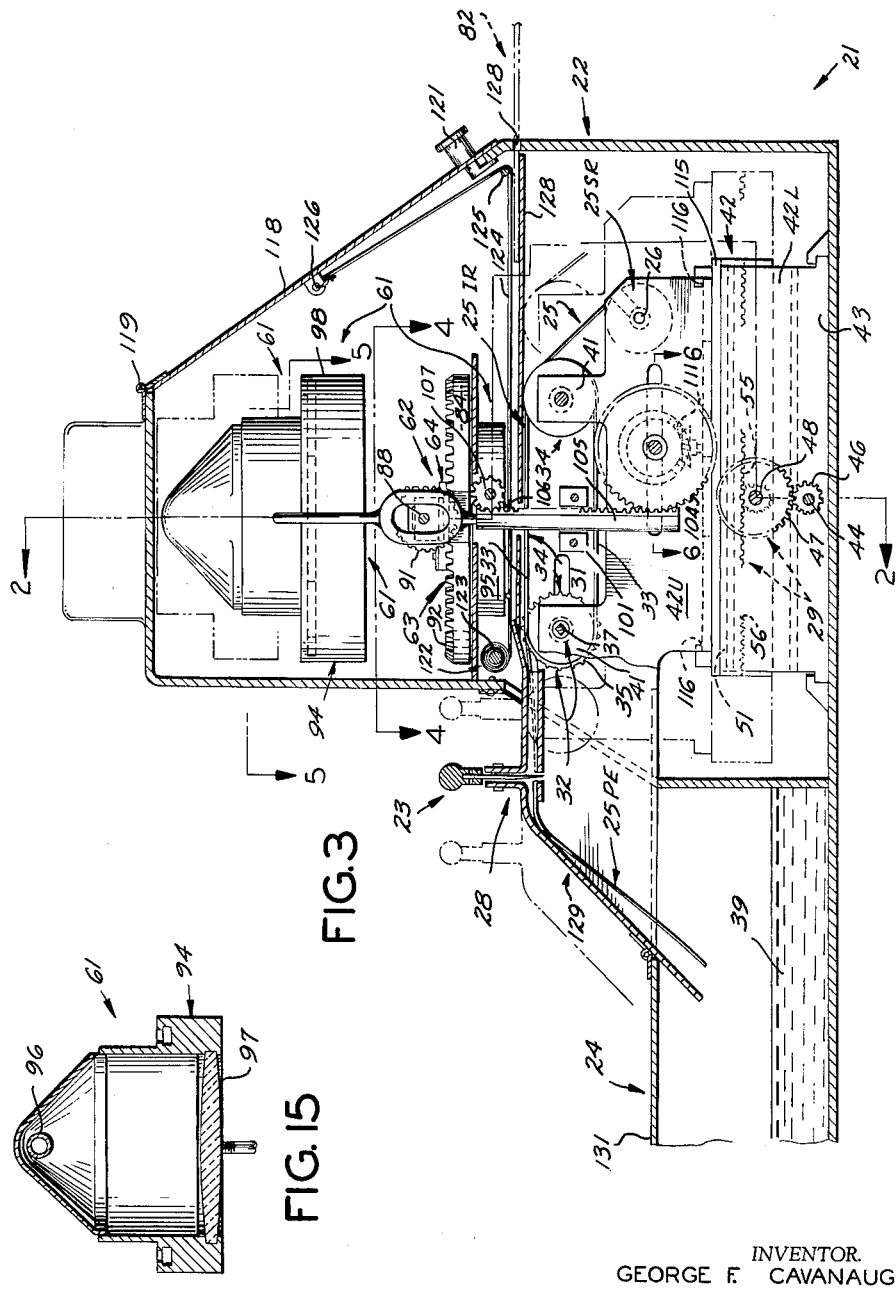

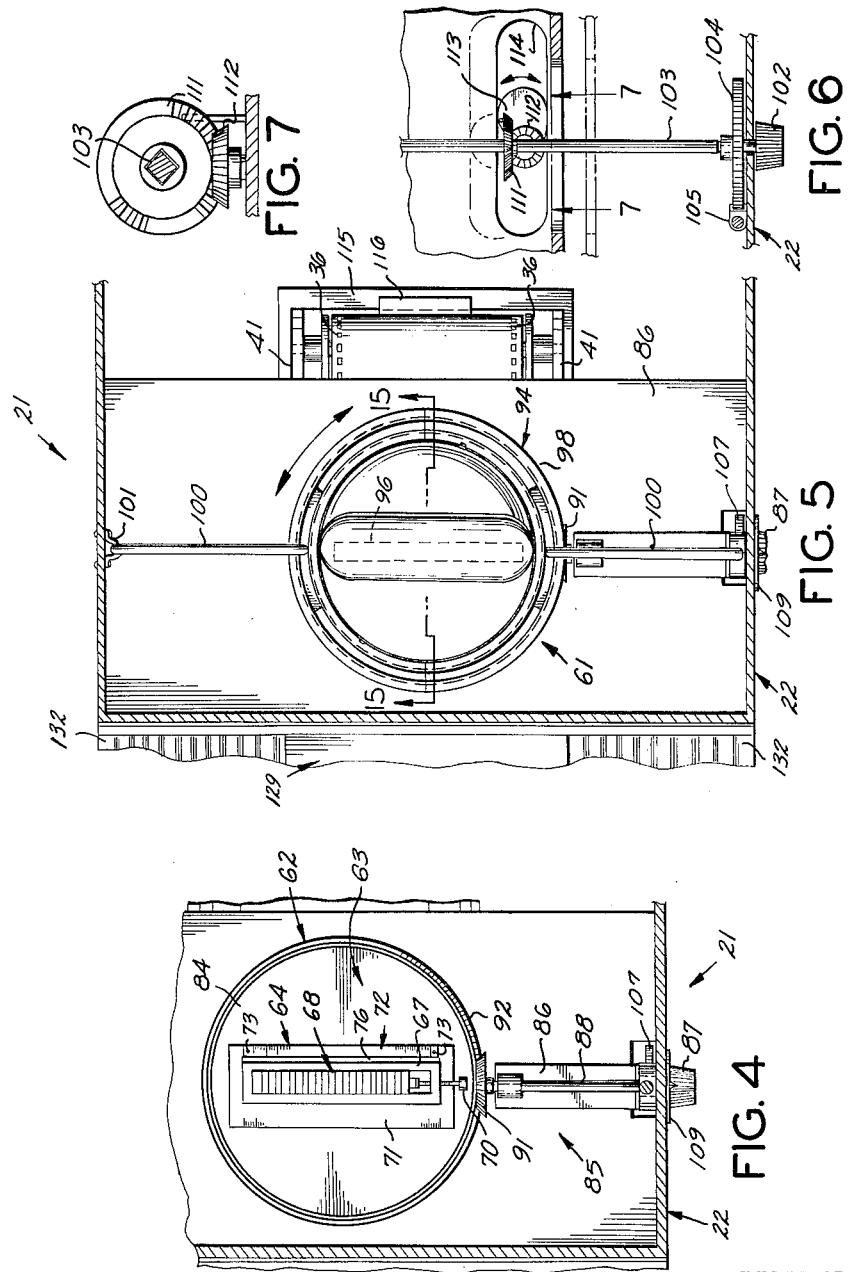

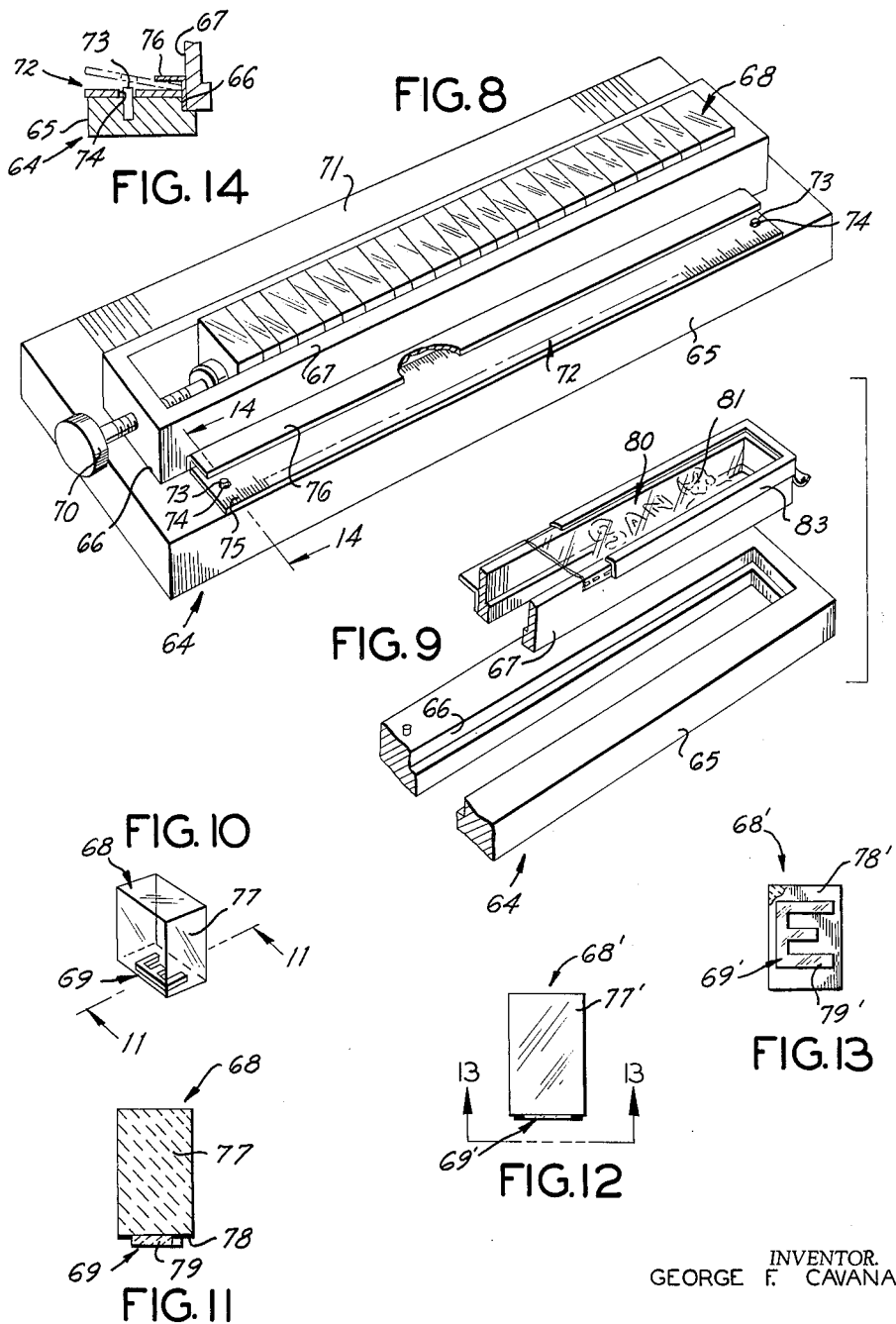

United States Patent Office 3,198,095
Patented Aug. 3, 1965

3,198,095
PHOTO-COMPOSING APPARATUS
George F. Cavanaugh, 1224 S. Westmoreland,
Los Angeles, Calif.
Filed Jan. 18, 1963, Ser. No. 252,453
9 Claims. (Cl. 95—4.5)

Generally speaking, the present invention relates to the typographical and printing arts and, more particularly, to photo-composing apparatus for photographically producing an exposed photographic film which may be used for making a printing plate in a conventional manner; the photographic production of said exposed photographic film being accomplished a line at a time by hand-setting a line of image-producing matrices in a manner similar to the hand-setting of conventional type in a composing stick and by then optically projecting the plurality of image-producing matrices of said line thereof onto a corresponding line exposure portion or region of a photosensitive film panel of larger size, which thereafter may be subsequently moved and again exposed with another line of such hand set image-producing matrices and/or pictorial material until such time as a complete film panel of a desired size has been exposed in the desired manner, after which it is adapted to be developed (and fixed, if desired) so as to bring the latent images into real form on the developed and removed film panel which can then be used in a conventional manner for making printing plates.

In a preferred form of the invention a copy and plotting board adapted to simulate the film panel which is to be exposed may be positioned for convenient correlated use by a compositor using the photo-composing apparatus and is preferably provided with printer's measurement gauge means along all edges thereof so that the compositor can determine precisely how the film panel will be exposed by correlating it with the exteriorly positioned visibly observable copy and plotting board. In other words, the compositor will measure any desired position with respect to the copy board through the use of mutually perpendicular printer's measurement gauges carried thereby and will be able to correlate this with the size of the projected image-producing matrices on the corresponding location of the inner film panel so that the compositor will know at all times precisely how he is laying out and exposing said film panel. He can do this by comparison with the external copy and plotting board.

Also, if the compositor lays out the exact copy on the copy or plotting board in exact correspondence with the projection of each corresponding line of image-producing matrices at corresponding locations on the inner film panel, this will act as a means for preventing accidental double exposure of the same line exposure region of the inner film panel since the compositor would automatically move to the next location on the exterior copy and plotting board when the next line of image-producing matrices is to be projected on the next line exposure region of the inner film panel. This is so because, at the time that the compositor so moves to the next desired position on the copy or plotting board, he will also operate the appropriate control knob on the apparatus for the purpose of correspondingly moving the inner film panel in the same fashion and in exact correspondence therewith.

It should also be noted that, in one preferred form of the invention, the means for projecting each independently hand-set line of image-producing matrices, one after the other in sequence, may also be controllably adjustable so as to modify the size of the image projected on the corresponding line exposure region of the inner film panel which is to be sequentially exposed before subsequent developing and removal. This feature of the invention will make it possible to cause said film panel to be exposed so as to bear latent images corresponding to any of a plurality of different type sizes such as would be produced by conventional printing through the actual use of such different type sizes in physical form, but which can be produced with the apparatus of the present invention without the necessity of varying the actual physical size of the image-producing matrices, since the size variation in the image projected on the inner film is accomplished optically by the enlarging or reducing effect of the optical projection means employed.

Also, in one preferred form of the invention wherein the optical projection means is arranged to controllably modify the size of the alpha-numeric symbol image projected on the inner film panel, the apparatus may be provided with effective margin compensation means adapted to hold a constant margin along the left margin of the projected copy irrespective of the effective size adjustment of the alpha-numeric symbol image projected on the inner film panel.

Also in one preferred form of the invention, the plurality of image-producing matrices may be adapted to be removably mounted relative to the inner film panel and projection means in a controllably rotatively adjustable manner so that the effect of hand-setting type at various angles, either clockwise or counterclockwise displaced from the normal horizontal position, may be produced on the line exposure region of the film panel.

In one preferred form of the invention, the effective film panel referred to above comprises that portion of a continuous length of film which lies directly over the top of controllably adjustable mounting means for mounting said film panel for rectilinear adjustment in either of two mutually perpendicular directions in a plane transverse to the optical axis of the hereinbeforementioned optical projection means whereby to make it possible to effectively positionally adjust the line exposure region on said film panel which will receive a next line of projected images produced by the image-producing matrices when the next optical projection thereof is produced by operation of the projection means. In one preferred form of the invention, said controllably adjustable mounting means, or the means for operating same, may be effectively provided with indicia means, usually in the form of printer's measurement scale means, for measuring movements of the film panel in printer's measurement scale form so that correlation of the projected copy with that visually observed on the hereinbeforementioned exteriorly visible copy and plotting board may be achieved.

It should be clearly noted that the film is adapted to be controllably moved in an advancing manner between exposures so as to effectively remove said film panel after complete line-by-line exposure of same and replace same with a new effective unexposed film panel so that the removed and line-by-line exposed film panel can be cut off by cut-off means and moved into a development means for effective development of the latent images carried by said exposed and removed film panel portion.

It should be noted that, in one preferred form of the invention, each of said image-producing matrices includes light modifying means having different light transmission characteristics from remaining portions thereof whereby to provide for selective differential exposure of a corresponding image exposure location on said film panel; said differential exposure corresponding to the shape of the desired alpha-numeric symbol which is to be photographically produced at said location on said film panel.

It should be noted that I am aware of the fact that various types of photo-composing systems for the photographic production of alpha-numeric symbols have been invented and developed heretofore. However, most such systems known to me have major disadvantages of one type or another.

For example, certain of said systems employ an individual alpha-numeric-symbol, sequential selection and exposure system of photo-composition such that a compositor is not aware of whether or not he has made any mistakes in the composition and, after completion of such an operation and subsequent development of the exposed film, will only then discover his composing mistakes. This is a highly inefficient system and is substantially completely avoided by the present invention wherein the composing step is essentially a hand-composing step very similar to that employed by conventional printers when hand-setting a line of conventional type. This has the advantage that the compositor, after hand-setting each line of image-producing matrices corresponding to type, can quickly and visually check to determine the correctness of what he has just hand-set and can do this before projecting the entire line of alpha-numeric symbol images onto the inner film panel whereby to produce corresponding latent images thereon for subsequent development and removal with the complete film panel.

Thus it can be seen that the novel photo-composing apparatus of the present invention substantially completely eliminates and overcomes the above-mentioned prior art problem of such prior art photo-composing systems.

Furthermore, many of such prior art systems are relatively slow in operation and require optical printing of each individual alpha-numeric symbol image after it has been individually selected, thus necessarily putting a limit on the speed with which a complete composing operation can be completed.

On the other hand, it will be noted that the novel photo-composing apparatus of the present invention allows hand-setting of the image-producing matrices in a manner identical to the hand-setting of conventional printing type, which most printers can do very rapidly, after which the complete line of hand-set optical matrices is projected onto the corresponding line exposure region of the inner film panel, which is then moved to the next position for reception of the next line of projected images of the next hand-set line of image-producing matrices, etc. In other words, a complete film panel can be correctly exposed a line at a time and with the possibility of error virtually eliminated, because of visual inspection of each hand-set line of optical matrices before projection, in a very rapid manner which is quite analogous to the hand setting of conventional type and which, therefore, requires virtually no retraining of a skilled printing compositor.

Thus it will be seen that the novel photo-composing apparatus of the present invention uses to the maximum advantage the conventional skills of the average printer or printing compositor without any basic retraining and allows him to produce, in a very rapid manner and with a minimum of mistakes, an exposed and developed photographic film panel which can be used for producing a printing plate.

Also, in one preferred form of the present invention, the apparatus is arranged to mount one or more interchangeable slides in projection relationship with respect to the optical projection means for projecting onto a selected region of the inner film panel. Such slides may comprise screens, stencils, tonal or ornamental borders or the like, adapted to produce corresponding latent images on the film panel.

Another type of such slide may effectively comprise a complete light-barring seal which will prevent any light from reaching the inner film panel when placed in operative position. This is normally done when a new assembly of image-producing matrices in a composing stick type holder is to be placed within the apparatus for later projection by the projection means onto the film panel. Also, said light-barring seal may act as a screen upon which the projected images of the assembly of image-producing matrices may be projected in order to see how the complete line of alpha-numeric symbols will appear.

In other words, this comprises means for direct proof-reading of the hand-set image-producing matrices rather than checking the matrices themselves in the composing stick holder means for errors.

With the above points in mind, it is an object of the present invention to provide a novel photo-composing apparatus embodying any of the generic and/or specific aspects thereof referred to above and which is capable of quickly and easily sequentially exposing individual portions of a film panel in correspondence with individual hand-set lines of image-producing optical matrices of alpha-numeric symbols, and/or pictorial representations or effective matrices which may comprise film holders for developed film bearing images such as pictorial representations or the like which it is desired to project onto the film panel at one or more selected locations with respect to the lines of alpha-numeric symbols projected thereon also.

It is a further object of the present invention to provide photo-composing apparatus of the character referred to above which is of relatively foolproof, easy-to-operate construction such as to utilize to the maximum the already developed skills of a conventional printer or printing compositor, whereby to be conducive to widespread use thereof.

It is a further object of the present invention to provide photo-composing apparatus of the character referred to hereinbefore in any of its various generic and/or specific aspects which is of a character such that any individual line or multiple line portion of the developed film panel, after completion of a photo-composing operation with respect thereto, can be quickly and easily effectively corrected by hand-setting a corrected line of optical image-producing matrices, projecting same on a corresponding portion of another inner film panel within the apparatus, and developing and removing said film panel portion for superimposition over the corresponding erroneous portion of the previously exposed and developed complete film panel.

Further objects are implicit in the detailed description which follows hereinafter (which is to be construed as exemplary of the invention but not specifically limiting it) and said objects will be apparent to persons skilled in the art after a careful study of the detailed description which follows hereinafter.

For the purpose of clarifying the nature of the present invention, one exemplary but non-specifically-limiting embodiment of the invention is illustrated in the hereinbelow-described figures. However, several slight variations of the image-producing matrices and equivalents are shown.

FIG. 1 is a reduced-size, partly broken away perspective view of one exemplary embodiment of the present invention.

FIG. 2 is a larger-scale, cross-sectional view taken in the direction of the arrows 2—2 of FIG. 3, with certain portions of the apparatus removed for drawing simplification reasons.

FIG. 3 is a view, partly in elevation and partly in section, taken in the direction of the arrows 3—3 of FIG. 2. In other words, this view is taken just to the right of, and behind, the left side wall of the front cabinet of the apparatus as viewed in FIG. 2. However, the portion of the apparatus underlying the cut-off knife and effectively connecting the front cabinet with the developing tank is also shown in section in a manner similar to the showing of the front cabinet portion and, therefore, this portion of the figure is taken in a plane displaced to the right of the arrows 3—3 of FIG. 2.

FIG. 4 is an enlarged fragmentary view which comprises partly a sectional view and partly a top plan view taken in the direction of the arrows 4—4 of FIG. 3 and shows one exemplary embodiment of the multiple matrix holder means, or composing stick type of holder means, adapted to hold a line of hand-set image-producing matrices in a controllably adjustable manner and in the proper location with respect to the optical projection means for projection of a corresponding line of symbol images on a corresponding portion of the film panel located in the lower portion of the apparatus.

FIG. 5 is a staggered-plane, fragmentary, top view taken in the direction of the arrows 5—5 of FIG. 3 and is partly a top plan view and partly a cross-sectional view of the front housing portion. This view clearly shows the top portion of the controllably adjustable projection means which is adapted to project images corresponding to the image-forming matrices shown in FIG. 4 onto the film panel located in a lower portion of the apparatus.

FIG. 6 is an enlarged fragmentary view, partly in section and partly comprising a top plan view, taken in the direction of the arrows 6—6 of FIG. 3, and illustrates a portion of the means for adjusting the optical projection means for varying projected image size while simultaneously compensating for and correcting the position of the lower film panel so as to maintain a constant left margin of the projected images on said film panel.

FIG. 7 is a larger-scale view, partly in section and partly in elevation, taken in the direction of the arrows 7—7 of FIG. 6.

FIG. 8 is a larger-scale, partly broken away, perspective view illustrating one exemplary embodiment of the multiple-matrix composing stick type of holder means adapted to receive and hold, in laterally adjacent relationship, a plurality of the image-producing matrices which are to be employed for projecting corresponding images on the film panel located in the lower portion of the apparatus best shown in FIGS. 1–3.

FIG. 9 is a fragmentary exploded view of the composing stick holder means of FIG. 8 with a modified arrangement adapted to mount a film type of matrix bearing one or more pictorial representations in optically distinctive form thereon and suitable for projection by projection means onto a corresponding portion of the film panel located in the lower portion of the apparatus as best shown in FIGS. 1–3.

FIG. 10 is a perspective view of one exemplary type of image-producing matrix wherein the alpha-numeric symbol is of transparent material carried on the bottom surface of the transparent matrix which, however, has an opaque bottom surface surrounding the transparent alpha-numeric symbol.

FIG. 11 is a cross-sectional view taken in the direction of the arrows 11—11 of FIG. 10.

FIG. 12 is an elevational view of a slight modification of the form of image-producing matrix shown in FIGS. 10 and 11, wherein the optically transparent matrix carries a rectangular portion of film on the bottom thereof which has an alpha-numeric symbol defined by a transparent or substantially transparent region of said film which is surrounded by substantially opaque portions of said rectangle of film.

FIG. 13 is a bottom plan view taken in the direction of the arrows 13—13 of FIG. 12.

FIG. 14 is a fragmentary sectional view taken in the direction of the arrows 14—14 of FIG. 8 and clearly illustrates the controllably positionally interchangeable scale means which is adapted to be positioned so that any of four different printers' measurement scales is visibly apparent to a compositor when he is hand-setting a line of the image-producing matrices. This will facilitate the effective composition of the corresponding line of latent images on the inner film panel in the lower portion of the apparatus, as best shown in FIGS. 1–3, so that it will be of proper size and location for the purposes intended by the compositor. The compositor may also use any of said scales in a manner correlated with the degree of enlargement or reduction of the corresponding images produced by the optical projection means to determine the actual final size of each alpha-numeric symbol, and each line thereof, on said film panel in terms of printers' measurements, that is "points," "pica," etc.

FIG. 15 is an enlarged, partly broken away, fragmentary view, partly in elevation and partly in section, taken in the direction of the arrows 15—15 of FIG. 5, illustrating certain details of the upper portion of the projection means.

Generally speaking, the photo-composing apparatus of the present invention is designated by the reference numeral 21 and is shown in one exemplary, but non-specifically-limiting, form wherein it comprises a main cabinet or housing, indicated generally at 22, which carries the remainder of the apparatus of the present invention therein except for the cut-off knife means, which is indicated generally at 23 and which is positioned therebehind and except for a photographic developing and/or fixing tank means, indicated generally at 24, which is positioned behind the cut-off knife means 23 for the reception of a previously line-by-line exposed film panel which has been cut off by the cut-off knife means 23 for subsequent developing (and usually fixing) of the latent images carried by said cut off exposed film panel.

In the exemplary, but non-specifically-limiting, form of the invention illustrated, the film panel referred to above is indicated at 25IR, as best shown in FIG. 3, while said cut off previously exposed film panel is indicated generally at 25PE and is shown in said FIG. 3 immediately after being cut off by the cut-off knife means 23 and as it is about to fall into the interior of the developing tank means 24.

It should be clearly noted that, in the exemplary but non-specifically-limiting form of the invention illustrated, said film panel 25IR, as shown in FIG. 3, which is in the projected-image-receiving position, is actually part of a continuous length of photo-sensitive film, generally designated by the reference numeral 25, which may be any type of photo-sensitive material which can be continuously fed to the image-reception region where the film panel portion 25IR is positioned as shown in FIG. 3 and which, after line-by-line exposure thereof in said region, can then be fed forwardly or toward the left as viewed in FIG. 3 to the location of the cut-off knife means 23 where it can be cut off as is clearly shown in FIG. 3 so that the previously exposed film panel portion 25PE can be cut off and dropped into the developer tank 24.

In one typical form of the invention, which is not to be construed as limiting it, the photo-sensitive film 25 might be approximately 11 or 12 inches wide in a width direction across the length thereof and might be of any desired length which can be conveniently stored in the spirally wound supply roll form, indicated generally at 25SR, where it is mounted on a supply reel or spindle 26 for feeding the film 25 upwardly and forwardly through the image-reception region or area, indicated generally at 27, and then, after exposure as described hereinafter, forwardly to the cut-off region indicated generally at 28 where it can be cut off by the cut-off knife means 23 for reception by the developing tank means 24.

In the exemplary, but non-specifically limiting, form of the invention illustrated, the above-mentioned forward feeding action of the film 25 from the film supply roll 25SR is effected by controllably adjustable mounting means, indicated generally at 29, as best shown in FIGS. 2 and 3, which is provided with upper forwardly moving support means, indicated generally at 31, adapted to carry the image-receiving film panel portion 25IR in a flat horizontal manner at the top thereof when in said image-reception region, indicated at 27, and which is also provided with forward movement means operable for controllably advancing a forward portion of the film, indicated generally at 25, toward the cut-off region 28 and for correspondingly moving an additional similarly sized portion from the film supply roll 25SR upwardly and into the image-reception region 27 where it will then effectively become the new image-receiving so called "film panel" 25IR; said movement means being generally indicated at 32 in FIGS. 2 and 3. Said controllably adjustable film panel mounting means 29, the upper support means 31 at the top thereof, and said forward movement means 32 will be described in greater detail hereinbelow as follows.

The support means 31, which is carried by the controllably adjustable mounting means 29, effectively comprises a continuous endless loop conveyor belt 33 which passes around two longitudinally spaced parallel drum portions, such as indicated generally at 34, as best shown in FIG. 3, thus providing an arrangement adapted to support the film panel portion 25IR thereabove during exposure thereof as described in detail hereinafter, and then adapted to effectively feed said exposed film panel portion forwardly toward the cut-off region 28 in the manner referred to hereinbefore.

The above-mentioned forward feeding movement is effected by reason of the fact that the forward one of said drums 34 is provided with a pair of axially spaced sprockets or sets of circumferential sprocket teeth, as indicated at 35, and positioned for driving engagement with corresponding sprocket holes 36 carried along both marginal portions of the film 25. Said sprockets or sprocket teeth 35 cooperable with the sprocket holes 36 of the film 25 and the shaft 37 and manually operable exteriorly positioned control knob 38 may all be said to comprise the hereinbefore mentioned forward movement means generally designated by the reference numeral 32.

It will readily be understood that after the film panel 25IR, in the image-reception position as best shown in FIG. 3, has been completely line-by-line exposed in a desired manner as described in detail hereinafter, it then becomes the exposed film panel 25PE and can be manually forwardly advanced by operation of the knob 38 into a position where its rear edge lies in the cut-off region 28 so that it can be cut off by operation of the cut-off knife means 23 to drop said exposed film panel 25PE into the latent image developer liquid 39 in the developing tank means 24 best shown in FIG. 3.

It should be noted that since the film panel 25IR, when in the image-reception position 27 shown in FIG. 3, is adapted to be controllably exposed a line at a time with alpha-numeric symbol images, as described in detail hereinafter, corresponding to printing or the like, it is desirable that said film panel 25IR be controllably positionally adjustable in two mutually perpendicular directions in a plane transverse to the optical axis of the projection means which will project said alpha-numeric symbol images thereon, thus making it possible to determine and controllably locate, in an exact manner, the precise projection line region where any given group of alpha-numeric symbol images is projected on said film panel 25IR.

The above-mentioned type of mutually perpendicular positional control of the film panel 25IR is provided by the hereinbefore mentioned controllably adjustable mounting means, generally designated by the reference numeral 29, which will now be described in detail.

It will be noted that the two drums 34 are rotatably carried by upstanding arm portions 41 of a slidable carriage means, indicated generally at 42, which includes an upper carriage portion 42U and a lower carriage portion 42L.

The lower carriage portion 42L is mounted by threaded base flange means 43 on a transversely directed lead screw 44 which is freely rotatively but non-longitudinally movably mounted in the side walls of the housing 22 whereby to provide an arrangement such that rotation of said lead screw 44 in one direction or the other will cause corresponding transverse rectilinear movement of said lower carriage portion 42L in either of the two directions indicated by the arrows 45 in FIG. 2. Such rotation of the lead screw 44 is provided by a spur gear 46 pinned to the lead screw 44 at one end thereof and in driven engagement with respect to another larger spur gear 47 carried by a shaft 48 which extends to a position exterior of the housing 22 where it is pinned to a manually operable control knob 49. It is apparent that manual rotation of the control knob 49 in one direction will cause transverse movement of the lower carriage portion 42L in the direction of one of the arrows 45, while rotation of said knob 49 in the other direction will cause transverse movement of said lower carriage portion 42L in the direction of the other arrows 45, as best shown in FIG. 2.

Also, it should be noted that the upper carriage portion 42U mentioned above is longitudinally slidably mounted with respect to the lower carriage portion 42L for longitudinal movement thereof in a direction perpendicular to either of the transverse directional arrows 45 shown in FIG. 2. This longitudinal mounting of the upper carriage portion 42U with respect to the lower carriage portion 42L is provided by the slidable dovetail mounting means best shown at 51 in FIG. 2.

Relative longitudinal movement of the upper carriage portion 42U with respect to the lower carriage portion 42L is effected by manual rotation of a knob 52 (best shown in FIG. 2) which is pinned to a square or other non-round type of shaft 53 which extends transversely across the interior of the housing or cabinet 22 between side walls thereof with its left end, as seen in FIG. 2, being rounded and being rotatively mounted in a receiving bearing 54 positioned adjacent to the previously mentioned spur gear 47. However, it should be clearly noted that there is no rotative coupling between the non-round shaft 53 and said spur gear 47. Said non-round shaft 53 is positively rotatively coupled to the central similarly keyed or non-round portions of a pair of spur gears 55 (as best shown in FIGS. 2 and 3) in a manner such that rotation of the knob 52 will cause similar rotation of both of said spur gears 55, each of which is in driving engagement with respect to the corresponding longitudinal toothed rack 56 carried at the bottom of the upper carriage portion 42U, thus effectively longitudinally slidably moving said upper carriage portion 42U with respect to the lower carriage portion 42L as determined by the direction and extent of rotation of the manually rotatable knob 52.

It should be noted that the spur gears 55, while keyed to the square shaft 53, are freely slidably movable along the length thereof in a transverse direction, thus freely allowing the lower carriage portion 42L, and the upper carriage portion 42U carried thereby, to be transversely moved as determined by the direction and extent of rotation of the manually rotatable knob means 49 as described in detail hereinbefore.

It should be noted that the forward movement advancement knob 38, being carried by the upper carriage portion 42U, must be capable of longitudinal movement therewith. Therefore, its shaft 37 is mounted in the longitudinal slots 57 in each of the side walls of the housing or cabinet 22. This is best shown with respect to one of said slots 57 in FIG. 1.

It should be clearly noted that the various elements described in the preceding paragraph, with the exception of the manual forward movement advancement knob 38 and the slots 57, all comprise part of the hereinbefore generally referred to controllably adjustable mounting means, generally designated by the reference numeral 29.

It will readily be understood from the detailed description which has been set forth above that the controllably adjustable mounting means, indicated generally at 29, the film panel support means, indicated generally at 31, and the film forward movement means, indicated generally at 32, all cooperate to provide an arrangement adapted to allow virtually any type of positional control of the film panel portion 25IR for the reception of images projected thereon by the projection means and for the controllable advancement in a forward direction of said film panel between such exposures and after all of said exposures of a given film panel have been completed, thus making it possible to produce virtually any desired layout of effective "copy" on the exposed film panel which can be controllably determined by reason of the fact that the lateral movement adjustment knob 49, and the longitudinal movement adjustment knob 52 are adapted to be provided with scale or indicia means of the type clearly indicated at 58 in FIG. 1 with respect to the knob 49 (a similar arrangement being provided for the other knob 52 on the opposite side of the cabinet 22) marked off in printer's measurement or scale form such as in terms of "points," or the scale may preferably be in "pica" units each of which corresponds to twelve of said "points."

The above-mentioned arrangement will enable a compositor to adjust either or both of the knobs 49 and 52 a desired number of said "points" or "picas" in correspondence with his markings on an external copy and plotting board of similar size and correspondingly rectilinearly marked off with similar printer's scale measurements so as to precisely control the layout of images projected onto the image-receiving film panel 25IR. Longitudinal positioning of the film panel 25IR, through advancement thereof prior to the first exposure and after each subsequent line-by-line exposure, can be precisely determined by manual rotation of the longitudinal or forward movement control knob 38, which similarly is provided with scale means as indicated at 59 also marked off in terms of printer's measurements form such as in terms of "points" or in terms of "picas" or the like, thus making it possible for the compositor to precisely determine relative longitudinal position of any projected line of alpha-numeric symbols by comparing it with an external copy and plotting board, as mentioned above, which is of the same size and similarly marked off with similar printer's measurement scale means along the margins thereof.

The exemplary, but non-specifically-limiting, form of the invention illustrated also includes optical projection means, generally designated by the reference numeral 61, adapted to cooperate with image producing means, indicated generally at 62, in a manner such as to project a plurality of images onto a selected projection line region of the film panel 25IR whereby to expose said projection line region of said film panel 25IR in a manner which will produce latent images thereon which can be rendered visible by subsequent developing in the developing tank means 24.

Usually, the image-producing means 62 and the optical projection means 61 are controllably projection-operated a plurality of times in sequence in a manner alternating with controllable advancement and repositioning of the film panel 25IR as determined by the forward movement advancement knob 38 and either of the other rectilinear position-adjustment knobs 49 and 52.

Thus, in effect, the optical projection means 61 operates to expose, a line at a time, the film panel 25IR until it has been advanced out of the image-receiving region 27. Subsequently, after it has been advanced past the cut-off region 28 as best shown in FIG. 3, the pivotally mounted cut-off knife means 23 is then operated to sever said exposed film panel 25PE so that it can drop into the developing liquid 39 in the developing tank means 24 for developing and subsequent removal for conventional plate-making use.

In the specific example illustrated, the above-mentioned image-producing means, indicated generally at 62, actually comprises a controllably adjustable rotary mounting structure 63 and multiple matrix holder means, indicated generally at 64, which is shown removed from the rotary adjusting means 63 and, indeed, completely removed from the entire housing 22 in FIG. 8.

The above-mentioned multiple matrix holder means may be said to comprise a particular or special type of composing stick comprising a base portion 65 having an apertured portion 66 therein adapted to receive and mount an apertured frame 67 therein which, in turn, is adapted to receive in laterally aligned relationship a variable number of matrices, as indicated generally at 68, with each matrix having distinctive light-modifying means, such as indicated at 69 in FIGS. 10 and 11, and at 69' in FIGS. 12 and 13, simulating in shape and configuration a desired alpha-numeric symbol and thereby being adapted, by reason of differential transmission of light therethrough, to produce a corresponding image on a corresponding part of said film panel portion 25IR in the image-reception region 27 shown in FIG. 3.

It will be noted that the frame 67 is provided with a threaded screw 70 which can be threadedly advanced for locking abutment against the end one of the plurality of side-by-side positioned matrices 68 which have been effectively hand-set by a compositor in the composing stick type of holder 64. This hand-setting operation, in accordance with a line of copy which is to be projected onto the film panel 25IR at a particular location thereon as determined by the adjustment of the previously described knobs 38, 49, and 52, is facilitated by the conventional printer's measurement scale 71 and by the controllably removable and repositionable multiple scale means, indicated generally at 72, which actually carries four different types of printer's measurement scales thereon in different units of length and which can be lifted off of the mounting pins 73 (which normally are received through the holes 74) and can then be either turned around, while maintaining the same upper surface, to present a different scale, or can be turned over and repositioned on said pins 73, or can, after being turned over, be turned around length-for-length again and mounted on said pins 73. This makes it possible to present in a visibly observable manner only a selected one of said scales, such as designated by the reference numeral 75 in FIG. 8, of the four scales, since the two scales on the bottom surface will be hidden and since the other scale on the top surface will lie under the obscuring lip 76.

However, various other mounting arrangements may be employed and it should be clearly noted that the use of the composing stick type of holder 64, the multiple-image producing matrices 68, and the various printer's measurement scale means 71 and 72 are all in accordance with conventional practice and, therefore, it is believed unnecessary to describe the details of a hand-setting operation by a compositor.

It should be noted that each matrix 68 effectively comprises a substantially light-transmissive body portion 77 having a substantially light-opaque surface portion 78 surrounding a light-transmissive portion 79 in the shape of a desired alpha-numeric symbol. In other words, the light-transmissive portion 79 shaped in the form of a desired alpha-numeric symbol and the surrounding substantially opaque portion 78 effectively comprise the light-modifying means, indicated generally at 69, by defining, in a differential light transmission manner, the desired alpha-numeric symbol which can, therefore, be readily optically projected by the projection means 61 onto a desired part of the film panel portion 25IR.

However, it should be clearly noted that various other differential light transmission arrangements optically speaking and/or physical speaking, may be employed in lieu of the matrix arrangement shown in FIGS. 10 and 11 and the slightly modified form shown in FIGS. 12 and 13 where the light modifying means 69' comprises a complete panel or rectangle of thin-sheet form, such as film or the like, having the substantially opaque outer portion 78' and the substantially light-transmissive portion 79' in the shape of a desired alpha-numeric symbol, carried at the bottom of the body 77' of the light-transmissive material.

It should also be noted that the image-producing means 62 is not limited to a plurality of laterally adjacent matrices, such as those indicated at 68, but may also include means for mounting a film transparency or the like, such as indicated generally at 80 in FIG. 9, which bears one or more pictorial representations, such as indicated at 81, or any equivalent thereof and adapted to be mounted with respect to the holder means 64 and positioned in the apparatus as indicated at 62 in FIG. 3 for projection of the pictorial representation 81 onto a desired part of the film panel portion 25IR. The film transparency 80 may be a negative from an ordinary camera, although most commonly it will be a photo negative from a 35 millimeter, 16 millimeter, or 8 millimeter camera which uses movie type film, although not specifically so limited, and, normally speaking, half-tone screens, such as generally indicated in phantom in FIG. 3, may be removably positioned over the film panel 25IR so that the latent image produced on the film panel 25IR will be suitable for the direct production of a half-tone printing plate portion corresponding thereto.

As previously mentioned, after a desired line of the image-producing matrices 68 has been hand-set, or a pictorial image-producing matrix such as the film transparency 80, has been mounted relative to the holder means 64, said holder means is then adapted to be mounted in the position shown at 62 in FIGS. 3 and 4 by positioning said holder means 64 in a stepped shoulder 83 of a centrally downwardly apertured rotary ring member 84 which is rotatively mounted and adapted to be controllably manually rotated by means, indicated generally at 85 in FIGS. 2 and 4, and carried by a horizontal support strip or panel 86 carried by the left side wall of the housing 22 as shown in FIG. 2.

The above provides an arrangement such that the entire image-producing means 62 is rotatively mounted relative to the film panel 25IR for angle-printing in any desired relationship, as determined by rotation of an exterior knob 87 which is pinned to a shaft 88 extending into the interior of the housing or cabinet 22 and which rotates a bevel gear 91.

The bevel gear 91 cooperates with the meshing ring gear 92 carried by the ring structure 84 whereby to rotate the complete image-producing means 62 into any desired angular position, as determined by the position of said knob 87 with respect to an exterior scale 93 which is calibrated in terms of angular measurement. In other words, the rotative mounting of the image-producing means 62 may be said to comprise in effect a rotary turret.

It should be noted that, in the exemplary but non-specifically-limiting form of the invention illustrated, the projection means, generally indicated by the reference numeral 61, comprises an upper projection lamp assembly means, indicated generally at 94, and a controllably variable focal length projection lens, indicated generally at 95.

In the exemplary but non-specifically-limiting form of the invention illustrated, the image-producing means, indicated generally at 62 (and, therefore, the platform 84) is effectively supported by the projection lamp assembly means 94 in a relationship with respect to the lamp 96 and the condensing lens 97 such as to effectively image the lamp 96 on the plurality of matrices 68 for optical projection purposes.

It should be noted at this point that the relative position of the condensing lens means 97 may be adjusted, as may the relationship between the projection lamp assembly means 94 and the image-producing means 62 in certain forms of the invention, if desired.

The rotary positional relationship of the image-producing means 62 (and also of the projection lamp assembly means 94) with respect to the film panel 25IR can be adjusted at will by rotary adjustment of the exterior knob 87 and is described hereinbefore. This requires that the structures indicated at 94 and 62 be rotatively mounted within the housing 22 for effective rotation by said manual operation of the exterior knob 87 and this rotative mounting of said entire image-producing means 62 and said entire projection lamp assembly means 94 carrying same is provided by reason of the fact that the complete projection lamp assembly means 94 is rotatively mounted by slidable ring portion means 99 carried by support members 100 which are vertically slidably mounted with respect to the interior side walls of the housing or cabinet 22 by brackets 101.

The arrangement just described is such that rotation of the entire image-producing means 62, caused by rotation of the exterior knob 87, for projecting a line of alpha-numeric symbols at an angle is accompanied by rotation of the entire projection lamp assembly means 94 rotatively carried by the ring portions 99 and the support rods 100 in the manner described above.

However, it should be clearly noted that this is an exemplary arrangement only and is not intended to specifically limit the invention to the exact arrangement just described and illustrated in the figures. Actually, the projection lamp assembly means 94 may be non-rotatably mounted in certain forms of the invention and the rotary mounting may be provided for the image-producing means 62 only. Furthermore, in certain forms of the invention where the angle printing feature is not desired, the rotary mounting of the image-producing means 62 may also be eliminated.

In one preferred form of the invention, the arrangement and mounting of the complete projection means 61, the image-producing means 62 and the film panel 25IR are such as to make it possible, by controllable adjustment of an exterior control knob 102, to effectively adjust the ratio of the size of each alpha-numeric symbol image projected onto the film panel 25IR relative to its actual size as defined by the light-transmissive image-shaped portion 79 of the matrix 68 shown in FIGS. 10 and 11 or by the light-transmissive image-shaped portion 79' of the matrix 68' shown in FIGS. 12 and 13. This also applies to the modified type of light-modifying means, indicated generally at 80 in FIG. 9, wherein pictorial images of variable optical density substitute for the alpha-numeric symbols of the other matrices 68. In other words, the apparatus is arranged so that it can be controllably adjusted by rotation of the exterior knob 102 for effective enlargement or reduction of the latent image size projected onto the film panel 25IR in the lower portion of the housing 22.

One preferred form of the invention also includes, in association therewith, margin compensation means adapted to compensate for such latent image size adjustment in a manner whereby to maintain a consistent and predetermined left edge margin (or any other desired margin in certain forms of the invention) of all of said projected images with respect to the film panel 25IR.

In the exemplary but non-specifically limiting form of the invention illustrated in the figures, said projected image size control knob 102 is pinned to a non-round or square shaft 103, which carries at opposite ends thereof the spur gears 104, each of which is in driving engagement with respect to corresponding vertical rack members 105 attached to the bottom end of the corresponding support members 100 which, as described hereinbefore, rotatively carry the projection lamp assembly means 94 (and the image-producing means 62 therebelow). One of the support members 100 (or, if desired, both of the support members 100) is provided with additional rack means 106 which is in driving engagement with respect to a spur gear 107 which rotates a shaft 108 which is coupled to the variable focal length projection lens, indicated generally at 95, for varying the focal length thereof in correspondence with the vertical movement of the image-producing means 62 whereby to maintain the proper optical relationships for proper projection of an enlarged or reduced size image onto the film panel 25IR in accordance with the rotative adjustment of the exterior image size adjustment knob 102. This can be determined by the relative position of the image size adjustment knob 102 with respect to the indicia or scale means 109 (best shown in FIG. 1) which indicates the relative degree of enlargement or reduction of the projected image on the film panel 25IR.

In connection with the above, it should be noted that the interior details of the variable focal length projection lens 95 are not shown since such are well known in the art and the specific structural details thereof comprise no part of the present invention. Furthermore, it should be noted at this point that various other enlarging and/or reducing projection arrangements may be employed in lieu of the arrangement specifically illustrated in the figures and described in detail herein. In certain forms of the invention, it may comprise an arrangement wherein a non-variable focal length projection lens is employed in lieu of the variable focal length projection lens shown at 95 and wherein it is provided with vertical position adjustment means correlated with the vertical positional adjustment of the image-producing means 62 whereby to act as an effective enlarging and/or reducing projection means.

In the projected image size adjustment structure illustrated in the figures, the rotation of the projected image size control knob 102 in one direction will obviously reciprocate the rods 100 (and, therefore, the image-producing means 62) in a manner correlated with the adjustment of the variable focal length projection lens means 95, as described above, in a manner such as to cause effective enlargement of the image projected on the film panel 25IR, while rotation of said knob 102 in the opposite direction will correspondingly cause reduction of the image projected on said film panel 25IR.

Incidentally, it should be noted that since rotation of the image size adjustment knob 102 causes vertical movement of the entire image-producing means 62 (and the platform 84), it is obvious that the rotary-position-determining control knob 87 will also be correspondingly vertically reciprocated and, therefore, the shaft 88 connected thereto lies in a vertical slot 110 to allow this movement to occur.

In this connection, it should be noted that this slot 110, together with all other slots of similar character adapted to allow slidable movement of shafts passing through the side wall of the housing 22 and connected to any one of the various control or adjustment knobs may be provided with light-tight effective optical sealing means of any well known type adapted to prevent the undesired entry of light into the interior of the housing 22. This is not shown in detail since such sealing means are well known in the art and comprise no part of the real basic inventive concept of the present invention.

Simultaneously with rotation of the knob 102 and the above described enlargement or reduction action, the keyed shaft 103 will correspondingly rotate the bevel gear 111, which is longitudinally slidably but non-rotatively keyed thereto, whereby to rotate the second bevel gear 112 and the cam 113 connected thereto which, by movement within the slot 114 will cause corresponding lateral shifting movement of the portion of said upper platform 42U lying above the longitudinal platform member 115 and transversely slidably mounted with respect thereto by the transverse dovetail engagement means indicated at 116. This comprises the above generically referred to compensation means since it will effect a lateral shifting movement of the film panel 25IR in a manner sufficient to compensate for the degree of enlargement or reduction effected by rotation of the knob 102 whereby to maintain a constant left margin of the latent images projected onto the film panel 25IR.

It should be noted that the shaft 103 is also mounted in a slot 117 in the same manner as the shaft 37 of the film advancement knob 38 and for the same reasons. That is, to allow longitudinal movement of the entire upper platform portion 42U with respect to the lower platform portion 42L in the manner described hereinbefore.

The cabinet or housing 22 is provided with access means so that a holder means of the type shown at 64 in FIG. 14 can be exteriorly hand-set with a desired number and type of image-producing matrices 68 or a pictorial image-producing matrix or matrices such as that shown at 80 in FIG. 9, and can then be inserted through said access means into the interior of the cabinet or housing 22 for mounting in the rotary ring means 84 at the general location indicated at 62.

In the exemplary, but non-specifically limiting form of the invention illustrated, said access means takes the form of an entry door 118, hinged as indicated at 119, and provided with a turn-fastener handle means, as indicated at 121, for controllably opening and closing same.

When the door 118 is opened it is important to prevent exposure of the inner film panel 25IR. Of course, this can be produced by employing exterior lighting of only the so-called "Safe Light" type; that is, the type to which the photo-sensitive film panel 25IR is relatively insensitive. Or various circuitous optical path entry means may be employed to prevent light from entering the housing 22 when the holder means 64 is placed therein and removed therefrom.

However, in the specific example illustrated, such protection is provided by effective closure blind means 122 mounted in roll form on a spring biased mounting spindle 123 and provided with laterally spaced apart, forwardly extending tensile members 124, passing under laterally inwardly directed short pin means 125 carried by side walls of the housing or cabinet 22 and then upwardly to a connection point 126 carried by the door 118. This provides an arrangement such that opening of the door 118 automatically pulls the opaque portion of the blind 122 completely across the central transverse interior region of the cabinet or housing 22 so as to completely cover all portions of the film 25 within the cabinet or housing 22.

Conversely, when the door 118 is closed, the blind or light shield 122 will be returned to its normal position so as to no longer obscure the film panel portion 25IR. This will occur under the action of biasing spring means associated with the mounting spindle 123 and not shown in detail since such arrangements are well known in the art.

It should also be noted that if it is desired to open the door 118 without pulling the light shield or blind 122 completely across the central portion of the cabinet or housing 22, this can be effected after the door 118 is open a short way by merely removing the tensile members 124 from the inwardly projecting pins 125. They can just as easily be replaced when it is desired to again place the light shield means in operative condition.

Also, in connection with the above, it should be noted that the light shield or blind means 122 can be arranged to be positioned very closely above the image-receiving surface of the film panel 25IR when the door 118 is opened, thus making it possible for a user of the apparatus to operate the switch means 127 so as to cause the projection lamp means 96 of the projection lamp assembly means 94 of the projection means 61 to be energized whereby to project an image on the upper surface of the blind 122 of all of the alpha-numeric symbols corresponding to the line of matrices 68 which have been handset in the holder 64 and then mounted in the mounting structure 63 as described in detail hereinbefore. In other words, this makes it possible to visually "proofread" the latent images which will be formed when the blind 122 is removed. This also makes it possible to check the extent of enlargement or reduction of said images and, in order to further facilitate this, the upper surface of the light shade or blind 122 may be appropriately marked off in a rectilinear fashion with squares or other markings corresponding to printer's measurement scale divisions such as in "points" and/or in "picas" or the like.

The apparatus of the present invention may also be provided with slide means for providing effective framing, contouring, tonal variations, and the like, of the latent image produced on the film panel 25IR or to half-tone screen a pictorial image such as would be produced by the pictorial matrix indicated at 80 in FIG. 9. One such typical exemplary slide means is indicated in phantom at 82 in FIG. 3 and is adapted to be slidably moved into position by slideway means, such as indicated at 128. However, the slide means and the slideway means may be modified substantially and/or repositioned as desired and, in certain forms of the invention, an opaque slide may be inserted at this region in lieu of the blind 122 to protect the film panel 25IR when the door 118 is opened and/or also for use in projecting an image onto the upper surface for "proofreading" purposes.

When a film panel has been fully exposed, a line at a time, and has been advanced by operation of the forward movement advancement knob means 38 into a position beyond the cut-off region 28 as shown in FIG. 3, the cut-off knife 23 is operated and the exposed film panel 25PE drops into the developer liquid 39 and is developed. This occurs by effective passage through the intermediate cabinet portion, indicated generally at 129, which is perhaps best shown in FIGS. 1 and 3. Then, after development of the previously exposed and now developed film 25PE, it is removed from the developing tank 24 by lifting the hinged lid 131 thereof. Then said developed film may be employed in any desired conventional way for making conventional printing plates.

It should be noted that, because of the longitudinal and lateral movement of the upper carriage portion 42U carrying the film 25, the intermediate housing portion 129 is coupled thereto for movement therewith. This is made possible with respect to transverse or lateral movement by the connection of said intermediate housing portion 129 to the main or front housing 22 by way of flexible walls 132 at each side of said intermediate cabinet portion 129.

The relative longitudinal movement of said intermediate cabinet portion 129 is made possible by reason of the fact that the panel portion 133 lying over the side parts of the developing tank 24 immediately behind the front top door portion 131, cooperates with slots 134 and spring-biased slot covers 135 carried by each side wall of the main cabinet portion 22 whereby to allow light-tight movement of said top wall portions 133 with respect to the side wall portions of the main cabinet 22.

It will be noted that said top wall portions 133 and said door 131 covering the developing tank 24 are oversize with respect to the area of said tank 24 whereby to allow such transverse and forward movement thereof along with the intermediate housing or cabinet portion 129 connected thereto.

It should be clearly noted that for the purpose of simplifying the drawings and/or for drawing space saving purposes, certain alterations of the actual apparatus of the exemplary but non-specifically-limiting embodiment of the invention illustrated in the drawings have been made and it is to be clearly understood that these are not to be construed as limitations. For example, it should be clearly understood that the modified holder means 64 shown fragmentarily in an exploded relationship in FIG. 9 of the drawings may also be provided with measurement scale means, such as that shown at 71 in FIG. 8, and the controllably repositionable multi-printer's measurement scale means, indicated generally at 72 in FIG. 8, if desired, and the structure may be of a similar nature. This is not shown in FIG. 9 in order to simplify the drawing and also to clearly indicate that if it is not desired, said measurement scale means may be eliminated in certain forms of the invention.

Also in connection with the above, it should be clearly noted that the vertical dimensioning and relative spacing of the apparatus, with particular reference to the space between the controllably variable focal length projection lens means 95 shown in FIGS. 2 and 3 with respect to the film panel 25IR, are effectively vertically compressed for drawing space saving reasons. In actual practice said vertical space between the variable focal length projection lens means 95 and the film panel 25IR would be substantially greater. This would facilitate the use of the blind means 122 for effective copy "proofreading" as referred to hereinbefore, and would also provide proper spacing for optimum projection of the images onto the film panel 25IR. This would also facilitate loading the device and threading the film into operative position. Incidentally, in connection with the use of the blind 122 for the "proofreading" purposes referred to above, it should be noted that, normally speaking, said blind 122, when drawn across the film panel 25IR, will lie immediately thereabove rather than to have the slight vertical spacing therebetween as shown in FIGS. 2 and 3 which is done for reasons of drawing clarity.

The arrangement just described merely illustrates one exemplary but non-specifically-limiting form of the invention and is not to be construed as specifically limiting the invention thereto. Actually, the apparatus of the invention may be modified substantially within the broad scope and teachings of the invention. For example, a variety of different types of positional adjustment means, film advancement means, image-producing means and positioning means, projection means and/or compensation means therefor may all be employed within the broad scope and teachings of the present invention and are intended to be included and comprehended as fully as if described, illustrated, and claimed in detail.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Photo-composing apparatus for photographically exposing a photosensitive film panel with a plurality of lines of type face images, a line at a time in sequence, with each line of exposed images on the film panel corresponding to a correlated hand-set line of image-producing matrices, for photographically producing an exposed photographic film panel for use in making a printing plate, comprising: multiple matrix composing stick holder means having apertured receiving recess means controllably removably and interchangeably replaceably provided with and receiving and mounting, in laterally adjacent relationship, a plurality of image-producing matrices, each having distinctive light-modifying means simulating in shape and configuration a type face corresponding to any of a plurality of alpha-numeric symbols which is to be projected onto said photosensitive film panel, the light-modifying means of each matrix having different light-transmission characteristics from adjacent portions of said matrix whereby to provide, in response to the transmission of light through said light-modifying means, a selective differential exposure of a corresponding image location on said film panel which is to be subsequently employed for making a printing plate having a corresponding portion provided with a corresponding alpha-numeric symbol; optical projection means positioned for controllably operable optical image producing and projecting relationship with respect to said composing stick holder means and said plurality of image-producing matrices controllably removably and interchangeably replaceably received and mounted in laterally adjacent relationship by said apertured receiving recess means thereof, and positioned in conventional projection relationship with respect to a corresponding line exposure portion of said film panel, whereby optically to produce images corresponding to desired alpha-numeric symbols and to project same, in sharply defined laterally adjacent relationship, a line at a time, on corresponding ones of said line exposure portions of said film panel, said optical projection means being provided with controllably adjustable means for varying the image sizes of images produced and projected onto said film panel at said line exposure region with respect to the actual size of the corresponding light-modifying means carried by the corresponding one of said plurality of image-producing matrices; compensation means for compensating for controllable adjustment of said optical projection means to vary the image sizes of images produced and projected onto said film panel and operable to maintain a consistent predetermined left margin of said projected images on said film panel; and controllably operable rotary position adjustment means for adjusting the relative position of said composing stick holder means and said plurality of image-producing matrices received and mounted thereby with respect to said film panel for varying the angle of each line of images projected onto said film panel relative to a true perpendiculary tranverse direction on said film panel said multiple matrix composing stick holder means being provided along one edge thereof with controllably removable and repositionable multiple scale means and means for mounting same in any of a plurality of different positions in a manner such as to display only a corresponding different one of said multiple scale means, each marked off in different units of printer's measurement.

2. Apparatus as defined in claim 1, including controllably adjustable mounting means for mounting said film panel for rectilinear adjustment in two mutually perpendicular directions lying in a plane transverse to the optical axis of said projection means and effectively provided with indicia means for indicating the precise degree of adjusting movement of said film panel, said line exposure region thereof and the side marginal and effective top and bottom edges of said film panel.

3. Apparatus as defined in claim 1, wherein said film panel comprises a portion of a continuous length of film which is effectively provided with and carried by forward advancement movement means for controllably advancing a forward portion of said film panel, a line at a time, toward a cut-off region and for moving an additional correspondingly sized portion of said continuous length of film forwardly to effectively become a part of said effective film panel.

4. Apparatus as defined in claim 1, wherein said film panel comprises a portion of a continuous length of film which is effectively provided with and carried by forward advancement movement means for controllably advancing a forward portion of said film panel, a line at a time, toward a cut-off region and for moving an additional correspondingly sized portion of said continuous length of film forwardly to effectively become a part of said effective film panel, said forward advancement movement means comprising effective conveyor belt means and driving sprocket wheel means, said length of film being provided with corresponding sprocket hole means cooperable with said driving sprocket wheel means for controllable advancing movement thereby.

5. Apparatus as defined in claim 1, wherein said film panel comprises a portion of a continuous length of film which is effectively provided with and carried by forward advancement movement means for controllably advancing a forward portion of said film panel, a line at a time, toward a cut-off region and for moving an additional correspondingly sized portion of said continuous length of film forwardly to effectively become a part of said effective film panel, said forward advancement movement means comprising effective conveyor belt means and driving sprocket wheel means, said length of film being provided with corresponding sprocket hole means cooperable with said driving sprocket wheel means for controllable advancing movement thereby, and including cut-off knife means positioned forwardly of said line exposure region and controllably operable for cutting off a film panel which has been previously exposed, line by line, in correspondence with a plurality of different laterally adjacent line-sets of said image-producing matrices.

6. Apparatus as defined in claim 1, wherein said film panel comprises a portion of a continuous length of film which is effectively provided with and carried by forward advancement movement means for controllably advancing a forward portion of said film panel, a line at a time, toward a cut-off region and for moving an additional correspondingly sized portion of said continuous length of film forwardly to effectively become a part of said effective film panel, said forward advancement movement means comprising effective conveyor belt means and driving sprocket wheel means, said length of film being provided with corresponding sprocket hole means cooperable with said driving sprocket wheel means for controllable advancing movement thereby, including cut-off knife means positioned forwardly of said line exposure region and controllably operable for cutting off a film panel which has been previously exposed, line by line, in correspondence with a plurality of different laterally adjacent line-sets of said image producing matrices, and photographic developing means positioned for the reception of said cut-off, previously exposed film panel and cooperable therewith for developing and rendering visible the plurality of line-by-line alpha-numeric symbol images latently carried thereby.

7. Apparatus as defined in claim 1, wherein said multiple matrix composing stick holder means is provided with film transparency holder means adapted to controllably hold and position in a projection plane with respect to said optical projection means a film transparency, effectively comprising a matrix means, bearing light-modifying means in the form of a pictorial representation which it is desired to project onto a corresponding surface portion of said film panel for subsequent development and for subsequent printing-plate-making purposes.

8. Photo-composing apparatus for photographically exposing a photosensitive film panel with a plurality of lines of type face images, a line at a time in sequence, with each line of exposed images on the film panel corresponding to a correlated hand-set line of image-producing matrices, for photographically producing an exposed photographic film panel for use in making a printing plate, comprising: multiple matrix composing stick holder means having apertured receiving recess means controllably removably and interchangeably replaceably provided with and receiving and mounting, in laterally adjacent relationship, a plurality of image-producing matrices, each having distinctive light-modifying means simulating in shape and configuration a type face corresponding to any of a plurality of alpha-numeric symbols which is to be projected onto said photosensitive film panel, the light-modifying means of each matrix having different light-transmission characteristics from adjacent portions of said matrix whereby to provide, in response to the transmission of light through said light-modifying means, a selective differential exposure of a corresponding image location on said film panel which is to be subsequently employed for making a printing plate having a corresponding portion provided with a corresponding alpha-numeric symbol; optical projection means positioned for controllably operable optical image producing and projecting relationship with respect to said composing stick holder means and said plurality of image-producing matrices controllably removably and interchangeably replaceably received and mounted in laterally adjacent relationship by said apertured receiving recess means thereof, and positioned in conventional projection relationship with respect to a corresponding line exposure portion of said film panel, whereby optically to produce images corresponding to desired alpha-numeric symbols and to project same, in sharply defined laterally adjacent relationship, a line at a time, on corresponding ones of said line exposure portions of said film panel, said optical projection means being provided with controllably adjustable means for varying the image sizes of images produced and projected onto said film panel at said line exposure region with respect to the actual size of the corresponding light-modifying means carried by the corresponding one of said plurality of said image-producing matrices; compensation means for compensating for controllable adjustment of said optical projection means to vary the image sizes of images produced and projected onto said film panel and operable to maintain a consistent predetermined left margin of said projected images on said film panel; controllably operable rotary position adjustment means for adjusting the relative position of said composing stick holder means and said plurality of image-producing matrices received and mounted thereby with respect to said film panel for varying the angle of each line of images projected onto said film panel relative to a true perpendicularly transverse direction on said film panel; controllably adjustable mounting means for mounting said film panel for rectilinear adjustment in two mutually perpendicular directions lying in a plane transverse to the optical axis of said projection means and effectively provided with indicia means for indicating the precise degree of adjusting movement of said film panel, said line exposure region thereof and the side marginal and effective top and bottom edges of said film panel, said film panel comprising a portion of a continuous length of film which is effectively provided with and carried by forward advancement movement means for controllably advancing a forward portion of said film panel, a line at a time, toward a cut-off region and for moving an additional correspondingly sized portion of said continuous length of film forwardly to effectively become a part of said effective film panel, said forward advancement movement means comprising effective conveyor belt means and driving sprocket wheel means, said length of film being provided with corresponding sprocket hole means cooperable with said driving sprocket wheel means for controllable advancing movement thereby; cut-off knife means positioned forwardly of said line exposure region and controllably operable for cutting off a film panel which has been previously exposed, line by line, in correspondence with a plurality of different laterally adjacent line-sets of said image-producing matrices; and photographic developing means positioned for the reception of said cut off, previously exposed film panel and cooperable therewith for developing and rendering visible the plurality of line-by-line alpha-numeric symbol images latently carried thereby said multiple matrix composing stick holder means being provided along one edge thereof with controllably removable and repositionable multiple scale means and means for mounting same in any of a plurality of different positions in a manner such as to display only a corresponding different one of said multiple scale means, each marked off in different units of printer's measurement.

9. Apparatus as defined in claim 8, wherein said multiple matrix composing stick holder means is provided with film transparency holder means adapted to controllably hold and position in a projection plane with respect to said optical projection means a film transparency, effectively comprising a matrix means, bearing light-modifying means in the form of a pictorial representation which it is desired to project onto a corresponding surface portion of said film panel for subsequent development and for subsequent printing-plate-making purposes.

References Cited by the Examiner

UNITED STATES PATENTS

| 1,166,504 | 1/16 | Webster | 95—4.5 |
| 1,553,920 | 9/25 | Smothers | 95—4.5 |
| 1,821,466 | 9/31 | Grass | 95—4.5 |
| 2,117,279 | 5/38 | Anson | 95—14 |
| 2,160,277 | 5/39 | Neidich | 95—4.5 |
| 2,280,096 | 4/42 | Morrison | 95—85 |
| 2,495,887 | 1/50 | Bumstead | 95—85 X |
| 2,638,824 | 5/53 | Freund | 95—4.5 |

FOREIGN PATENTS 664,880 12/38 Germany.

NORTON ANSHER, *Primary Examiner.*
JOHN M. HORAN, *Examiner.*